United States Patent
Su et al.

(10) Patent No.: US 9,071,376 B2
(45) Date of Patent: Jun. 30, 2015

(54) BANDWIDTH ADJUSTING METHOD AND COMMUNICATION NODE

(75) Inventors: Wei Su, Chengdu (CN); Huaping Qing, Chengdu (CN); Xi Huang, Amsterdam (NL); Chiwu Ding, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 558 days.

(21) Appl. No.: 13/464,885

(22) Filed: May 4, 2012

(65) Prior Publication Data

US 2012/0224857 A1 Sep. 6, 2012

Related U.S. Application Data

(63) Continuation of application No. PCT/CN2011/070211, filed on Jan. 12, 2011.

(30) Foreign Application Priority Data

Apr. 2, 2010 (CN) .......................... 2010 1 0139840

(51) Int. Cl.
*H04B 10/50* (2013.01)
*H04B 10/60* (2013.01)
*H04J 3/16* (2006.01)

(52) U.S. Cl.
CPC ............. *H04J 3/1682* (2013.01); *H04J 3/1652* (2013.01); *H04J 2203/0067* (2013.01); *H04Q 2213/1301* (2013.01)

(58) Field of Classification Search
None
See application file for complete search history.

(56) References Cited

U.S. PATENT DOCUMENTS

2008/0205443 A1   8/2008   Shi et al.

FOREIGN PATENT DOCUMENTS

| CN | 1691552 A | 11/2005 |
|----|-----------|---------|
| CN | 1832629 A | 9/2006  |
| CN | 1992712 A | 7/2007  |

OTHER PUBLICATIONS

International Search Report dated Apr. 14, 2011 in connection with International Patent Application No. PCT/CN2011/070211.
"Interfaces for the Optical Transport Network (OTN), Amendment 3: 100 Gbit/s support, one-stage multiplexing and other improvements", ITU-T, Recommendation ITU-T G,709/Y.1331 (2003)-Amendment 3, Apr. 2009, 73 pages.
"ODUflex hitless resizing method", Huawei Technologies Co., Ltd., China Mobile Communications Corporation, Telecommunication Standardization Section, Sep. 2009, 20 pages.
(Continued)

*Primary Examiner* — Darren E Wolf

(57) ABSTRACT

A bandwidth adjusting method and a communication node are provided. The adjusting method includes: sending, by an upstream ingress unit, a group of multi-channel parallel basic switch cells in which adjustment signaling is carried to all downstream branch egress units; sending normal signaling when determining that adjustment response statuses returned by all the downstream branch egress units are reception acknowledgment; after receiving the normal signaling by the downstream branch egress unit, adding or removing the basic switch cell into or from a next group of multi-channel parallel basic switch cells according to the adjustment signaling; and adjusting a time slot of an HO ODU sent by the downstream branch egress unit to a downstream node, and instructing the downstream node to adjust the time slot of the HO ODU. Through the method and the communication node, lossless bandwidth adjustment in a point-to-multipoint OTN asymmetric bandwidth carrier system is implemented.

6 Claims, 6 Drawing Sheets

(56) References Cited

OTHER PUBLICATIONS

"Report of Interim Q11/15 Meeting", Q11/15 Rapporteur, Mar. 2009, 10 pages.
Extended European Search Report issued on Jan. 23, 2013 in connection with European Application No. 11 761 918, 6 pages.
Written Opinion of the International Searching Authority dated Apr. 14, 2011 in connection with International Patent Application No. PCT/CN2011/070211.
Xiao Peng, et al., "Consideration on ODUflex resizing", Telecommunication Standardization Sector, Sep. 2009, 3 pages.
Jesef Roese, "Consideration on ODUflex resizing", Telecommunication Standardization Sector, Sep. 2009, 3 pages.

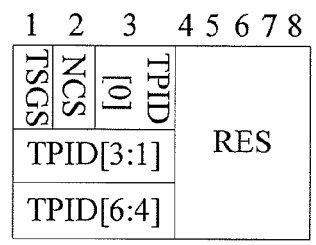

FIG. 5

| Unidirectional bandwidth adjustment is completed in a Link segment adjacent to a source node, and the source node triggers generating a unidirectional tributary slot connectivity check indication and then transfers the indication to a downstream node. | /A2 |

↓

| The first node receives the unidirectional tributary slot connectivity check indication, determines that the unidirectional bandwidth adjustment is completed in the Matrix segments crossed to all the branches of the local node and the Link segments adjacent to all the branches of the local node, and sends the unidirectional tributary slot connectivity check indication to all the downstream nodes. | /B2 |

↓

| When the unidirectional network connection response statuses that are returned by all the downstream nodes and received by the first node are reception acknowledgement, the first node sends the unidirectional network connection response status to an upstream node. | /C2 |

FIG. 6

BANDWIDTH ADJUSTING METHOD AND COMMUNICATION NODE

CROSS-REFERENCE TO RELATED APPLICATIONS

This application is a continuation of International Application No. PCT/CN2011/070211, filed on Jan. 12, 2011, which claims priority to Chinese Patent Application No. 201010139840.8, filed on Apr. 2, 2010, both of which are hereby incorporated by reference in their entireties.

TECHNICAL FILED

The present invention relates to the field of communications technologies, and in particular to a bandwidth adjusting method and a communication node.

BACKGROUND

As a core technology of a next generation transport network, an optical transport network (Optical transport network, OTN) has abundant Operation, Administration and Maintenance (OAM), strong tandem connection monitoring (TCM) and out-of-band forward error correction (FEC) capabilities, can implement flexible scheduling and management of a high-capacity service, and gradually becomes a mainstream technology of a backbone transport network.

An OTN frame is a 4080*4 modular structure and can carry a client signal. An optical channel data unit-flex (Optical Channel Data Unit-flex, ODUflex) is an OTN frame corresponding to a new rate level, and can carry services with different rates. During service transmission, the service is first mapped to a payload region of the ODUflex, and then the ODUflex is mapped to a high order optical channel data tributary unit-k.M (HO ODTUk.M), where M represents that the ODUflex occupies M time slots of the high order optical channel data unit-k (HO ODUk).

An OTN service carrier includes an OTN symmetric bandwidth carrier and an asymmetric bandwidth carrier. As for an OTN symmetric bandwidth carrier system, in upload and download directions, the number of time slots (Time Slot, TS) occupied by the ODUflex of encapsulating service and TS allocation condition are consistent; while as for the OTN asymmetric bandwidth carrier system, upload and download bandwidths of the carrier service are inconsistent.

For example, in a point-to-point OTN symmetric bandwidth carrier system shown in FIG. 1, a service passes through two intermediate nodes A and B from a source node to a sink node, and the channel is formed by three link (Link) segments and two cross matrix connection (Matrix) segments. During packet service transmission, the source node maps the packet service to the ODUflex, and maps the ODUflex into HO ODTU2.2 (the ODUflex occupies TS1 and TS4 of HO ODU2), the node A maps the ODUflex to HO ODTU3.2 (the ODUflex occupies TS5 and TS12 of HO ODU3) after the ODUflex is crossed by the node A, and then the node B maps the ODUflex to HO ODTU2.2 (the ODUflex occupies TS4 and TS5 of HO ODU2) after the ODUflex is crossed by the node B, and finally the sink node de-maps the packet service from the ODUflex. In the direction from the sink node to the source node, the packet service is transmitted according to the same bandwidth distribution.

Since the service traffic flow has a demand of non-real time dynamic change, the ODUflex needs to provide different bandwidths in different periods to meet the change demand of the traffic flow. With the increasing of the OTN carrier services, the asymmetric bandwidth services such as a Gigabit-capable passive optical network (Gigabit-Capable Passive Optical Network, GPON) and video on demand (Video On Demand, VOD) also increase. However, in the prior art, lossless adjustment is not performed on the OTN asymmetric bandwidth carrier, which cannot meet the change demand of the asymmetric bandwidth service traffic flow.

SUMMARY

Embodiments of the present invention provide a bandwidth adjusting method and a communication node, which can meet a change demand of an asymmetric bandwidth service traffic flow.

An embodiment of the present invention provides a bandwidth adjusting method, the method includes:

sending, by an upstream ingress unit of a local node, a group of multi-channel parallel basic switch cells to all downstream branch egress units of the local node, where first adjustment signaling is carried in the group of multi-channel parallel basic switch cells and is used for indicating unidirectional addition or removal of a basic switch cell;

returning, by the downstream branch egress unit, a first adjustment response status after receiving the group of multi-channel parallel basic switch cells carrying the unidirectional adjustment signaling;

sending, by the upstream ingress unit, first normal signaling to all the downstream branch egress units when determining that the received first adjustment response statuses returned by all the downstream branch egress units are reception acknowledgement; and after receiving the normal signaling, adding or removing, by the downstream branch egress units, the basic switch cell into or from a next group of multi-channel parallel basic switch cells according to the first adjustment signaling, adjusting a time slot of a high order optical channel data unit sent by the downstream branch egress units to a downstream node, and instructing the downstream node to adjust the time slot of the received high order optical channel data unit.

An embodiment of the present invention provides a communication node, where the node includes an upstream ingress unit and at least two downstream branch egress units.

The upstream ingress unit is configured to send a group of multi-channel parallel basic switch cells to the at least two downstream branch egress units, where first adjustment signaling is carried in the group of multi-channel parallel basic switch cells and is used for indicating unidirectional addition or removal of the basic switch cell; and send first normal signaling to the at least two downstream branch egress units when the received first adjustment response statuses returned by the at least two downstream branch egress units are reception acknowledgement.

The downstream branch egress unit is configured to return a first adjustment response status after receiving the group of multi-channel parallel basic switch cells carrying the unidirectional adjustment signaling; after receiving the first normal signaling, add or remove the basic switch cell into or from a next group of multi-channel parallel basic switch cells according to the first adjustment signaling; and adjust a time slot of a high order optical channel data unit sent by the downstream branch egress units to a downstream node, and instruct the downstream node to adjust the time slot of the received high order optical channel data unit.

The bandwidth adjusting method according to the embodiments of the present invention implements lossless bandwidth adjustment in a point-to-multipoint OTN asymmetric bandwidth carrier system, so as to meet the change demand of the asymmetric bandwidth service traffic flow.

BRIEF DESCRIPTION OF THE DRAWINGS

To illustrate the technical solutions according to the embodiments of the present invention or in the prior art more clearly, the accompanying drawings to be used for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 5 is a schematic structural diagram of a resizing control overhead sent in a direction from a sink node to a source node according to a method embodiment of the present invention;

FIG. 6 is a flow chart of a tributary slot connectivity check method according to a method embodiment of the present invention;

DETAILED DESCRIPTION

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Method Embodiment

Figure 1:
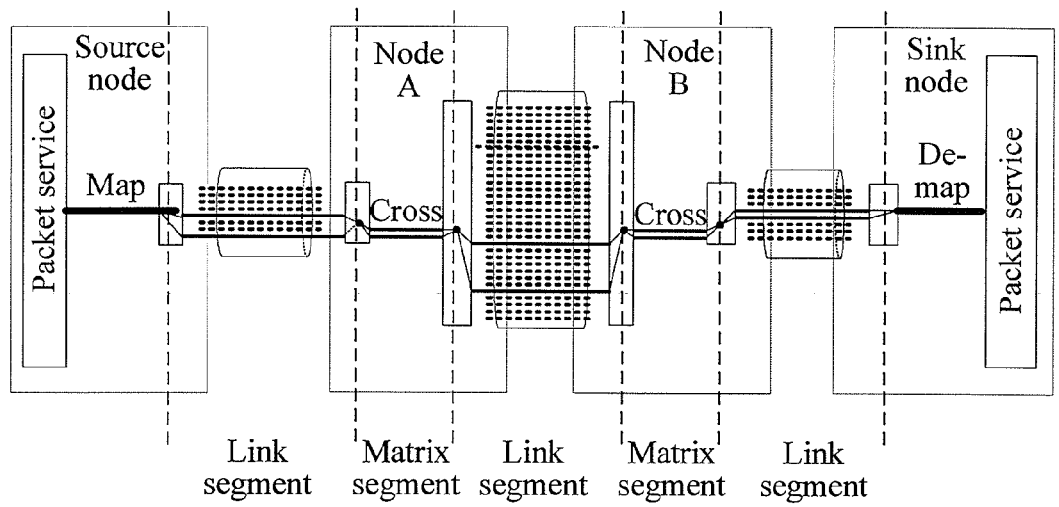
FIG. 1 is a schematic structural diagram of a point-to-point OTN symmetric bandwidth carrier system.
Figure 2:
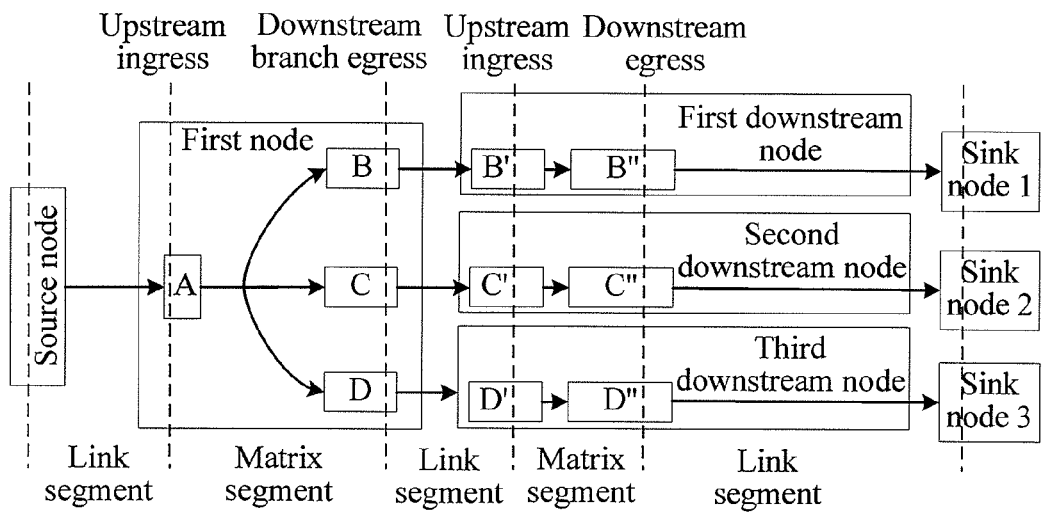
FIG. 2 is a schematic structural diagram of a point-to-multipoint OTN asymmetric bandwidth carrier system.
Figure 3:
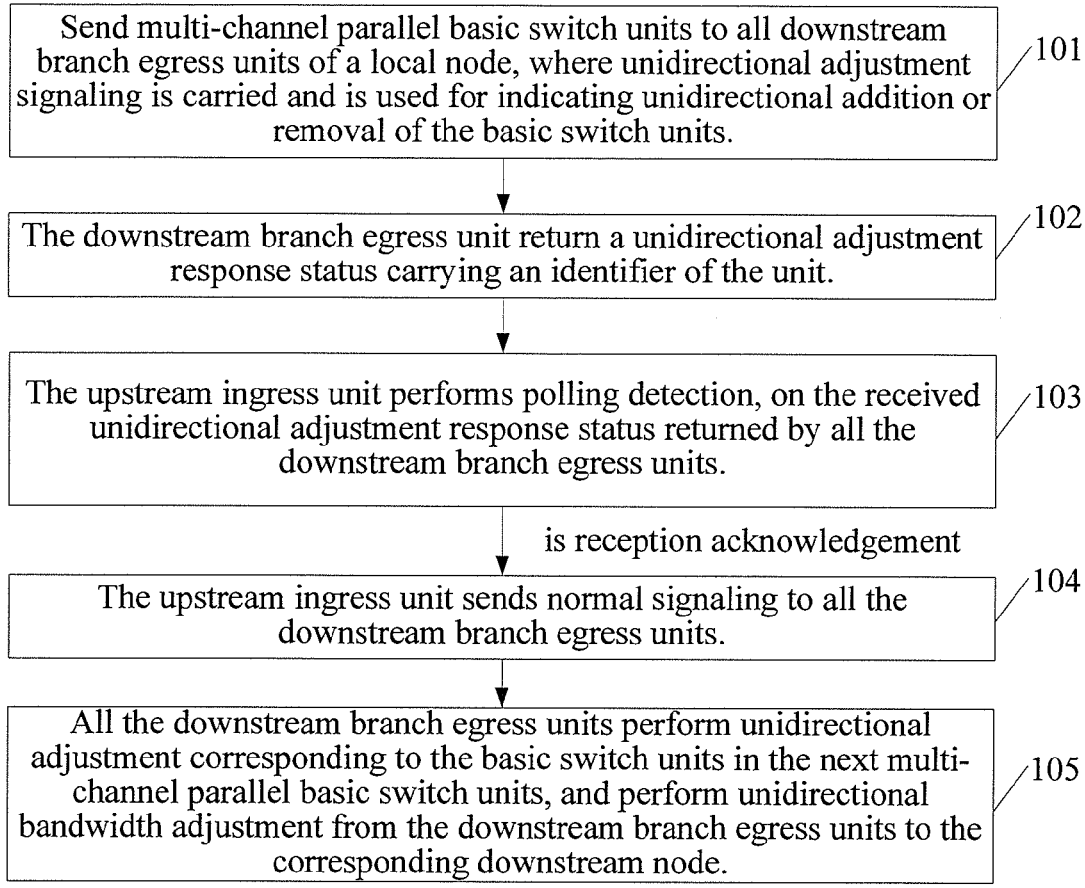
FIG. 3 is a flow chart of a bandwidth adjusting method according to a method embodiment of the present invention.

A bandwidth adjusting method is provided. The method of this embodiment is applicable to a point-to-multipoint OTN asymmetric bandwidth carrier system shown in FIG. 2. One source node may send a service to at least two sink nodes (three sink nodes are taken as an example in FIG. 2, that is, sink nodes 1, 2 and 3), and the service passes through intermediate nodes from the source node to the sink node, where the intermediate nodes include a first node and a downstream node. In FIG. 2, a case that two intermediate nodes is passed through and three Link segments and two Matrix segments are included is taken for example. A flow chart of the method of this embodiment is shown in FIG. 3, including:

Step 101: An upstream ingress unit A of a first node sends a group of multi-channel parallel basic switch cells to all downstream branch egress units B, C, and D of a local node, where unidirectional adjustment signaling is carried in the group of multi-channel parallel basic switch cells and is used for indicating unidirectional addition or removal of a basic switch cell (Basic Switch unit, BSC).

During a service transmission process, the source node first maps the service into an ODUflex through GFP-F, and then maps the ODUflex into an HO ODTUk.M channel through a generic mapping procedure (Generic Mapping Procedure, GMP), where the ODUflex occupies M time slots of the high order optical channel data unit, that is, HO ODUk; and finally sends the HO ODTUk.M to the first node in a downstream of the source node through a high order optical channel data transmission unit.

The upstream ingress unit A of the first node first de-maps the ODUflex from the HO ODTUk.M, carries the ODUflex in the group of multi-channel (at least two channels) parallel basic switch cells, and sends the group of multi-channel parallel basic switch cells to the downstream branch egress units B, C, and D. The downstream branch egress units B, C, and D separately de-map the ODUflex from the group of multi-channel parallel basic switch cells, map the ODUflex into a channel of a high order optical channel data tributary unit, and separately send the ODUflex to the corresponding downstream nodes.

It can be understood that, if the source node senses, according to local configuration or triggering of other devices, that it needs to adjust a bandwidth of the service carrier, the unidirectional adjustment signaling is carried in an HO ODU sent to the first node. The first node may sense, according to the HO ODU sent by the source node, that it needs to adjust the bandwidth, and then trigger this process. A network management system (Network Management System, NMS) may also deliver unidirectional adjustment signaling to each node in the system, and when the first node receives the unidirectional adjustment signaling sent by the NMS, the first node triggers this process. It can be understood that, this process may also be triggered through other manners.

Step 102: After receiving the group of multi-channel parallel basic switch cells carrying the unidirectional adjustment signaling, the downstream branch egress units B, C, and D return unidirectional adjustment response statuses that carry respective downstream branch egress unit identifiers and are used for indicating the reception of the unidirectional adjustment signaling; otherwise, return unidirectional adjustment response statuses indicating that the unidirectional adjustment signaling is not received.

Step 103: The upstream ingress unit A of the first node performs, according to a downstream branch egress unit list of the local node, polling detection on the unidirectional adjustment response statuses returned by the downstream branch egress units, and when it is determined that the received unidirectional adjustment response statuses returned by all the downstream branch egress units B, C, and D are reception acknowledgements, step 104 is performed.

In this embodiment, the first node needs to store the downstream branch egress unit list in the local node, and the list stores a corresponding relation between an upstream ingress unit identifier and all the downstream branch egress unit identifiers. When the polling detection is performed, the downstream branch egress unit identifier in the received unidirectional adjustment response status is compared with identifiers stored in the local node for determination.

Step 104: The upstream ingress unit A of the first node sends normal signaling to all the downstream branch egress units B, C, and D, for instructing all the downstream branch egress units to perform unidirectional adjustment on the corresponding basic switch cell when all the downstream branch egress units receive a next group of multi-channel parallel basic switch cells.

Step 105: The downstream branch egress units B, C, and D receive the normal signaling, and all the downstream branch egress units perform unidirectional adjustment of corresponding basic switch cell when receiving the next group of multi-channel parallel basic switch cells and perform unidirectional bandwidth adjustment from the downstream branch egress units to the corresponding downstream nodes.

If the basic switch cell is to be added, the downstream branch egress units add the basic switch cell to be added into the next group of multi-channel parallel basic switch cells, and the added basic switch cell carries services. If the basic switch cell is to be removed, the basic switch cell to be removed is removed from the next group of multi-channel parallel basic switch cells, and the removed basic switch cell does not carry any service, which ensures that the service is not impaired during the bandwidth adjusting process.

The bandwidth adjustment from the upstream ingress unit in the first node to all the downstream branch egress units is unidirectional bandwidth adjustment of the Matrix segments, while the unidirectional bandwidth adjustment from each downstream branch egress unit to the corresponding downstream node is bandwidth adjustment of the Link segments, which may be implemented through the following steps.

A1: The downstream branch egress unit sends the high order optical channel data tributary unit to the corresponding downstream node, where unidirectional adjustment signaling is carried in the high order optical channel data tributary unit for indicating unidirectional addition or removal of a time slot.

It can be understood that, the downstream branch egress units de-map service data of the ODUflex from the received group of multi-channel parallel basic switch cells, and map the service data into the corresponding high order optical channel data tributary unit-k.M (ODTUk.M); and a high order optical channel transmission unit sends the high order optical channel data tributary units to the downstream nodes. Specifically, the high order optical channel data tributary unit-k.M is multiplexed into a high order optical channel data unit, the high order optical channel data unit is then encapsulated into a high order optical channel transmission unit, and the high order optical channel transmission unit is sent to the downstream node.

B1: After receiving the high order optical channel data tributary unit carrying the unidirectional adjustment signaling, the downstream node may return a unidirectional adjustment response status through a resizing control overhead corresponding to a time slot in the high order optical channel data tributary unit, so as to indicate whether the downstream node receives the unidirectional adjustment signaling.

C1: When the unidirectional adjustment response status that is returned by the downstream node and received by the downstream branch egress unit is reception acknowledgement, the downstream branch egress unit sends normal signaling to the downstream node, where the normal signaling is used for instructing the downstream node to perform unidirectional adjustment of a corresponding time slot in a next multi-frame, that is, when receiving a next high order optical channel data tributary unit, for example, to allocate the time slot and carry a service or not to carry any service. Specifically, the normal signaling is carried in the current multi-frame (that is, the current high order optical channel data tributary unit), the current multi-frame is sent to the downstream node, and the time slot of the next multi-frame (that is, the next high order optical channel data tributary unit) are adjusted.

D1: When receiving the normal signaling, the downstream node performs unidirectional adjustment of the corresponding time slot in the next multi-frame.

It can be seen that, the bandwidth adjusting method in the embodiment of the present invention includes: the upstream ingress unit of the local node sends the group of multi-channel parallel basic switch cells to all the downstream branch egress units of the local node, where the unidirectional adjustment signaling is carried in the group of multi-channel parallel basic switch cells for indicating unidirectional addition or removal of the basic switch cell; the downstream branch egress unit return a unidirectional adjustment response status carrying the downstream branch egress unit identifier; the upstream ingress unit performs, according to a branch egress unit list of the local node, polling detection on the unidirectional adjustment response status returned by the downstream branch egress unit, and sends normal signaling when determining that the unidirectional adjustment response statuses returned by all the downstream branch egress units is reception acknowledgement; and the downstream branch egress units receive the normal signaling, perform unidirectional adjustment of corresponding basic switch cell when receiving the next group of multi-channel parallel basic switch cells, and perform unidirectional bandwidth adjustment from the downstream branch egress units to the corresponding downstream nodes. The method in the embodiment of the present invention implements lossless bandwidth adjustment in a point-to-multipoint OTN asymmetric bandwidth carrier system, and meets a change demand of an asymmetric bandwidth service traffic flow.

It can be understood that, in a specific embodiment, in step 101, when the upstream ingress unit A of the first node transfers the unidirectional adjustment signaling (that is, the transfer of the unidirectional adjustment signaling in the Matrix segment), the upstream ingress unit A may indicate unidirectional addition or removal of a corresponding basic switch cell according to transfer control signaling and a tributary port ID field in a resizing control overhead (Resizing Control Overhead, RCOH) corresponding to the basic switch cell to be adjusted. In step 105, when performing unidirectional bandwidth adjustment, the downstream branch egress unit and the downstream node transfer unidirectional adjustment signaling (that is, the transfer of the unidirectional adjustment signaling in the Link segment), and transfer through the resizing control overhead corresponding to the time slot to be adjusted.

Figure 4:
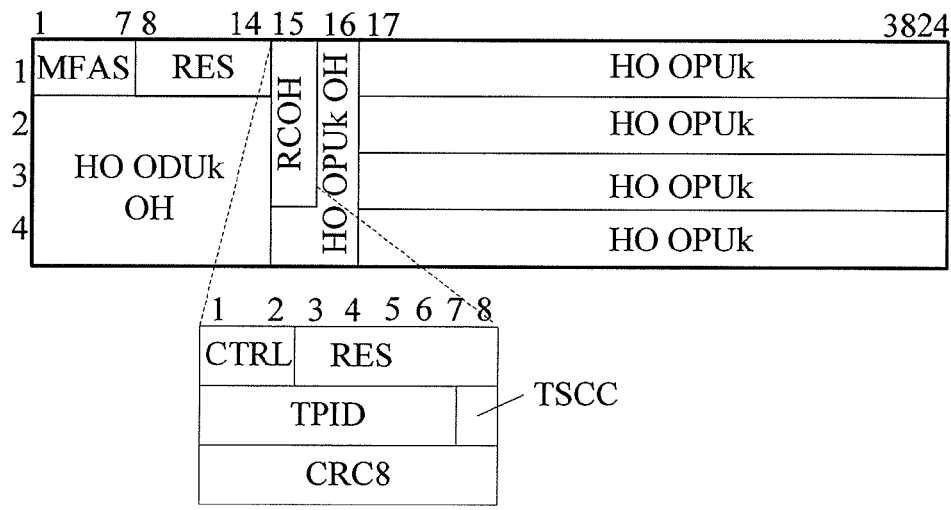
FIG. 4 is a schematic structural diagram of a high order optical channel data unit sent in a direction from a source node to a sink node and a resizing control overhead therein according to a method embodiment of the present invention.

As shown in FIG. 4, a structure of the high order optical channel data unit is a 3824*4 modular structure, which includes a multi-frame alignment signal (Multi-Frame Alignment Signal, MFAS) providing a frame synchronous positioning function, a high order optical channel data unit overhead field (HO ODUk OH) providing a maintenance and operation function, a high order optical channel payload unit overhead field (HO OPUk OH) providing a client signal adaptation function, a high order optical channel payload unit (HO OPUk) providing a signal carrying function, and reserved bytes (RES), where k represents a supported bit rate.

In rows 1, 2, 3 of column 15, one resizing control overhead is allocated for each time slot, and through the indication of the MFAS, the unidirectional adjustment signaling is carried through the resizing control overhead corresponding to the time slot to be adjusted, so as to implement the transfer of the adjustment signaling.

Specifically, one resizing control overhead includes transfer control signaling (CTRL), a tributary port ID (Tributary Port ID, TPID), tributary slot connectivity check (Tributary Slot Connectivity Check, TSCC), and a reserved bits and cyclic redundancy check of 8-bits (CRC8).

The CTRL occupies 2 bits (bits) and uses 00 to indicate idle (idle) signaling, 01 to indicate add (add) signaling, 10 to indicate remove (remove) signaling, and 11 to indicate normal (normal) signaling; the TPID occupies 7 bits for indicating which group the current basic switch cell or time slot belongs to; and the TSCC occupies 1 bit, is generated by the source node, and is set to 1 during tributary slot connectivity check.

In step 101, if the bandwidth needs to be increased, a specific value {add, #a} of {CTRL, TPID} in the resizing control overhead corresponding to the basic switch cell to be added is used to indicate that it is required to unidirectionally add the basic switch cell to carry a service. If the bandwidth needs to decreased, {remove, #a} in the resizing control overhead corresponding to the basic switch cell to be removed is used to indicate to unidirectionally remove the basic switch cell to carry a service, where #a represents an adjustment channel ingress port of the currently transmitted service.

It should be noted that, after receiving the group of multi-channel parallel basic switch cells carrying the unidirectional adjustment signaling, the downstream branch egress units B, C and D each return unidirectional adjustment response statuses to the upstream ingress unit A, and perform indication through a tributary port ID and a tributary slot group status field in a resizing control overhead corresponding to a basic switch cell in the group of multi-channel parallel basic switch cells, which is a returning manner of the unidirectional adjustment response status in the Matrix segment. The unidirectional adjustment response status returned by the downstream node to the downstream branch egress units in step 105 may be transferred by carrying a resizing control overhead corresponding to a time slot of the ODUflex, which is a returning manner of the unidirectional adjustment response status in the Link segment.

It can be understood that, the downstream branch egress unit list of the local node includes: a one-to-one corresponding relation between a downstream branch egress unit identifier of the local node and an associated basic switch cell. The unidirectional adjustment response status returned by the downstream branch egress unit is transferred through the tributary port ID and the tributary slot group status field in the resizing control overhead corresponding to a basic switch cell associated with the downstream branch egress unit identifier.

Referring to FIG. 5, a structure of a resizing control overhead returned by the downstream node or the downstream branch egress units is shown, including a TPID, a tributary slot group status (Tributary Slot Group Status, TSGS), a network connection status (Network Connection Status, NCS) and an RES.

The TSGS occupies 1 bit, uses 1 to indicate a reception acknowledgement (ACK) status and 0 to indicate a reception negative acknowledgement (NACK) status, is generated at the sink end, and determines the current status at an end for sending information. The NCS occupies 1 bit, and is generated by the sink node. When the received TSCC sent by the upstream node is shown as 1, a status for showing that the NCS is 1 is returned, indicating that the unidirectional channel adjustment is over.

For example, the downstream branch egress units return the group of multi-channel parallel basic switch cells to the upstream ingress unit, and use a specific value {#b\c\d, ACK} of {TPID, TSGS} in a resizing control overhead corresponding to one of the basic switch cells (for example, a first basic switch cell) to indicate that the information sent by the upstream ingress unit is received, where #b\c\d represents port numbers of the downstream branch egress units B, C, D.

During the bandwidth adjustment in this embodiment, after the downstream node or the downstream branch egress unit receives the unidirectional adjustment signaling, if it is required to adjust at least two basic switch cells, that is, to have the unidirectional adjustment signaling carried in the resizing control overheads corresponding to at least two basic switch cells, the resizing control overhead corresponding to each basic switch cell may not be required to carry a response status during the returning of the unidirectional adjustment response status, while one resizing control overhead is allocated for one TPID and the unidirectional adjustment response statuses corresponding to all the basic switch cells are bound in the allocated resizing control overhead. Here, one basic switch cell may be a first basic switch cell occupied by a channel in an opposite direction to the unidirectional channel, and corresponds to a tributary port ID of the downstream branch egress unit. In this way, resources occupied in the retransmission of the adjustment response status may be saved.

It can be understood that, in another specific embodiment, in step 105, when the downstream branch egress unit and the downstream node perform bandwidth adjustment in the Link segment, the downstream branch egress unit may indicate unidirectional addition or removal of the corresponding time slot in the high order optical channel data tributary unit sent to the downstream node, through the transfer control signaling and the tributary port ID field in the resizing control field corresponding to the time slot to be added.

Moreover, the downstream node may indicate the unidirectional adjustment response status of the corresponding time slot through the tributary port ID and the tributary slot group status field in the resizing control overhead corresponding to the time slot to be added in the returned high order optical channel data tributary unit. The downstream branch egress unit may instruct the downstream node to adjust in the next multi-frame through the transfer control signaling and the tributary port ID field when sending the normal signaling. In this way, signaling transmission can be reduced in the bandwidth adjusting process through including some necessary fields in the resizing control overhead.

It should be noted that, after the unidirectional bandwidth adjustment of the multiple Link segments and Matrix segments from the source node to the sink node, tributary slot connectivity check may be performed from the source node to the sink node, and the specific check process is implemented through the following steps, a flow chart of which is as shown in FIG. 6.

A2: The unidirectional bandwidth adjustment is completed in the Link segment adjacent to the source node, that is, the unidirectional bandwidth adjustment is completed in the Link segment from the source node to the first node, and the source node triggers to generate a unidirectional tributary slot connectivity check indication and then transfers the indication to the downstream node.

It can be understood that, the unidirectional tributary slot connectivity check indication may be indicated through a specific value {1} of {TSCC} in the resizing control overhead corresponding to the time slot to be adjusted in the high order optical channel data tributary unit, and a structure of the resizing control overhead is shown in FIG. 4.

B2: The first node receives the unidirectional tributary slot connectivity check indication sent by the source node, determines that the unidirectional bandwidth adjustment is completed in the Matrix segments crossed to all the branches of the local node and the Link segments adjacent to all the branches of the local node, and sends the unidirectional tributary slot connectivity check indication to all the downstream nodes.

Specifically, the unidirectional bandwidth adjustment is completed in a Matrix segment from the upstream ingress unit of the first node to at least two branch egress units and in a Link segment from at least two branch egress units to the corresponding downstream nodes. The tributary slot connectivity check indication TSCC=1 is transparently transmitted; otherwise, the tributary slot connectivity check indication TSCC=0 is transferred to all the downstream nodes.

The upstream ingress unit sends the normal signaling to all the downstream branch egress units, and all the downstream branch egress units perform unidirectional adjustment of the basic switch cell in the next group of multi-channel parallel basic switch cells. After the downstream nodes corresponding to all the downstream branch egress units perform the unidirectional adjustment of the time slot at the next multi-frame, the first node determines that the unidirectional bandwidth adjustment is completed in the Matrix segments crossed to all the branches of the local node and the Link segments adjacent to all the downstream branch egress units of the local node.

C2: The first node performs, according to the downstream branch egress unit list of the local node, polling detection on unidirectional network connection response statuses returned by all the downstream nodes. When determining that the unidirectional network connection response statuses that are returned by all the downstream nodes and received by the first node is reception acknowledgement, it indicates that the unidirectional bandwidth adjustment of the channels from the node to all the downstream nodes is completed, and then the first node sends the unidirectional network connection response status to the upstream node.

It can be understood that, the unidirectional network connection response status maybe indicated by a specific value {TPID, ACK\NACK} of {TPID, NCS} in the resizing control overhead corresponding to a time slot that is occupied by the unidirectional network connection response status in the high order optical channel data tributary unit. If the value is ACK, it indicates a status of reception acknowledgement; and if the value is NACK, it indicates a status of reception negative acknowledgement. A structure of the resizing control overhead is shown in FIG. 5.

It should be noted that, when the first node performs the unidirectional bandwidth adjustment in a multi-branch Matrix segment and performs the unidirectional tributary slot connectivity check in the multiple branches, the upstream ingress unit transfers the group of multi-channel parallel basic switch cells carrying the unidirectional adjustment signaling to the downstream multi-branch egress units according to a TPID list locally stored, and performs, according to the TPID list, polling detection on the unidirectional adjustment response status returned by each branch egress unit, so as to implement point-to-multipoint unidirectional bandwidth adjustment. Here, the TPID list includes a corresponding relation between an adjustment channel ingress port of the transmitted service and port numbers of the at least two downstream branch egress units.

The bandwidth adjusting method is described in the following through a specific embodiment. As shown in FIG. 2, in the point-to-multipoint OTN asymmetric bandwidth adjustment system, the bandwidth adjusting method triggered by the source node includes the following steps.

1. When the source node senses that the bandwidth needs to be increased, the source node sends the unidirectional adjustment signaling to the first node to increase the unidirectional bandwidth from, the source node to the Link segment of the first node.

2. When the first node receives the unidirectional adjustment signaling sent by the source node and senses that the bandwidth needs to be increased, the first node increases the unidirectional bandwidth from the upstream ingress unit A of the first node to the Matrix segments of all the downstream branch egress units.

Figure 7:
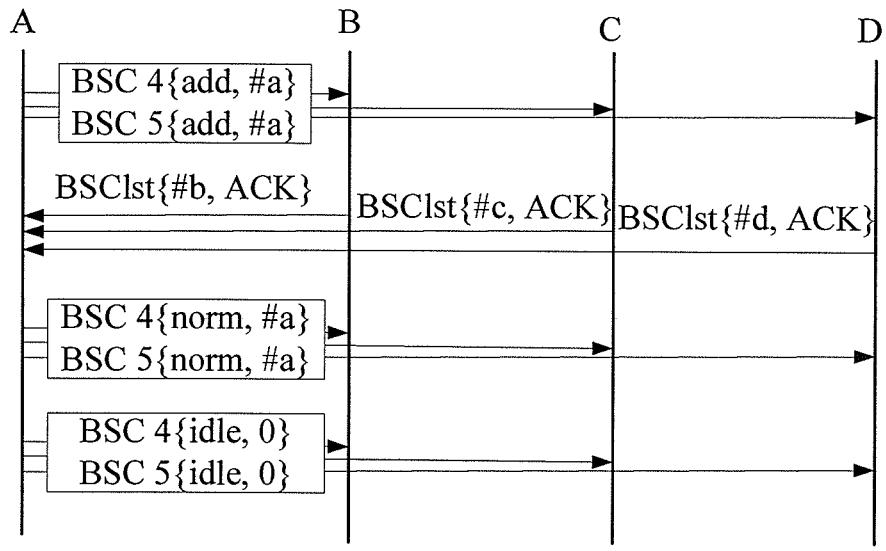
FIG. 7 is a flowchart of a bandwidth increasing method from an upstream ingress unit A of a first node to Matrix segments of all downstream branch egress units according to a method embodiment of the present invention.

Assuming the basic switch cell to be added are BSC4 and BSC5, the process is implemented specifically through the following steps, which is shown in FIG. 7.

(1) The upstream ingress unit A indicates the unidirectional adjustment signaling through {add, #a} in an ROCH corresponding to BSC4 and BSC5, and sends the unidirectional adjustment signaling to the downstream branch egress units B, C, and D, where #a represents an adjustment channel ingress tributary port number of the transmitted service.

(2) The downstream branch egress units B, C, and D receive the {add, #a} signaling, and return adjustment response statuses through a specific ROCH allocated for the upstream ingress unit A. The adjustment response statuses are {#b, ACK}, {#c, ACK} and {#d, ACK}, where #b, #c, #d represent egress tributary port numbers of the downstream branch egress units B, C, and D respectively.

(3) The upstream ingress unit A performs polling detection on the unidirectional adjustment response status returned by each downstream branch egress unit according to the TPID list shown in Table 1, waits until the received unidirectional adjustment response statuses returned by all the downstream branch egress units are ACK statuses, then indicates the normal signaling through {norm, #a} in the ROCH corresponding to BSC4 and BSC5, and instructs the downstream branch egress units B, C, D to perform BSC allocation in the next group of multi-channel parallel basic switch cells.

The TPID list shows a corresponding relation between an ingress tributary port number of a service to be added and all downstream egress tributary port numbers of the service to be added, and the relation is a one-to-many corresponding relation.

TABLE 1

| Ingress tributary port number of service to be added | All downstream egress tributary port numbers of service to be added | Position where the adjustment response status is carried |
|---|---|---|
| #a | #b | BSClst |
|  | #c | BSClst |
|  | #d | BSClst |

(4) The downstream branch egress units B, C, and D complete the BSC allocation in the next group of multi-channel parallel basic switch cells, that is, BSC4 and BSC5 to be added carry the service to be transmitted, thereby ensuring that the service are not impaired during the bandwidth adjusting process. The idle signaling may be indicated through {idle, 0} in the ROCH corresponding to BSC4 and BSC5, and the upstream ingress unit A sends the idle signaling to the downstream branch egress units B, C, and D, which indicates that the unidirectional bandwidth adjustment in the multi-branch Matrix segment is completed.

3. The downstream branch egress units receive the unidirectional adjustment signaling sent by the upstream ingress unit of the first node, sense that the bandwidth needs to be increased, and then increase the unidirectional bandwidth from the downstream branch egress units to the Link segments of the corresponding downstream nodes.

Figure 8:
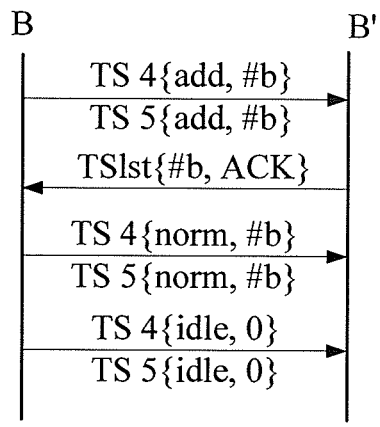
FIG. 8 is a flow chart of a bandwidth increasing method from a downstream branch egress unit to a Link segment of a corresponding downstream node according to a method embodiment of the present invention.

If two time slots to be added from B to B' are TS4 and TS5, two time slots to be added from C to C' are TS5 and TS6, and two time slots to be added from D to D' are TS7 and TS8. The two time slots to be added from B to B' are taken as an example, and the implementation of the adding of the time slots from C to C' and from D to D' is similar, which is implemented specifically through the following steps, a flow chart of which are as shown in FIG. 8.

(1) The downstream branch egress unit B indicates the unidirectional adjustment signaling through {add, #b} in an RCOH corresponding to TS4 and TS5 to be added, and sends the unidirectional adjustment signaling to the upstream ingress unit B' of one downstream node.

(2) B' receives the unidirectional adjustment signaling, and returns a unidirectional adjustment response status through a specific resizing control overhead allocated for the downstream branch egress unit B, such as the RCOH corresponding to the first time slot, that is, {#b, ACK}.

(3) When the unidirectional adjustment response status that is returned by B' and waited for and received by the downstream branch egress unit B is reception acknowledgement, the downstream branch egress unit B indicates the normal signaling through {norm, #b} in the RCOH corresponding to TS4 and TS5 to be added, sends the normal signaling to B', and instructs B' to allocate the time slots in the next multi-frame.

(4) B' completes the allocation of the time slots in the next multi-frame, that is, TS4 and TS5 to be added carry the service to be transmitted. The downstream branch egress unit B indicates the idle signaling through {idle, 0} in the RCOH corresponding to TS4 and TS5, and sends the idle signaling to B', which indicates that the unidirectional bandwidth adjustment in the Link segment is completed.

Likewise, the unidirectional bandwidth adjustment in the Link segment from C to C' and the Link segment from D to D' is processed according to the above method.

4. After B' receives the adjustment signaling, a downstream node completes the adding of the basic switch cell in the Matrix segment from B' to B"; after C' receives the unidirectional adjustment signaling, a downstream node completes the adding of the basic switch cell in the Matrix segment from C' to C"; and after D' receives the unidirectional adjustment signaling, a downstream node completes the adding of the basic switch cell in the Matrix segment from D' to D".

5. The processing of the tributary slot connectivity check from the source node to the sink node is like the connectivity check in Embodiment 1, and is not described in detail herein again.

In other specific embodiments, the adjustment of the point-to-multipoint OTN asymmetric bandwidth carrier system may be triggered through the NMS. During the adjustment of increasing the bandwidth, the NMS checks whether a unused time slot of the HO ODUk, where the unused time slot of the HO ODUk may be allocated for the ODUflex, exists in each Link segment from the source node to the sink node, and whether a unused basic switch cell which may be allocated for the ODUflex exist in each Matrix segment. If the requirements are met, the NMS allocates N time slots to be added for each Link segment in the ODUflex unidirectional channel link, and allocates N basic switch cells to be added for each Matrix segment.

Moreover, an adjustment instruction is transferred to each node in the ODUflex channel, and after receiving the unidirectional adjustment instruction, each node separately performs the unidirectional bandwidth adjustment in each Link segment and each Matrix segment, where the adjusting method is as described in the above method embodiment, and is not described in detail herein again. The NMS further needs to maintain the TPID list in each multi-branch node in the channel to be adjusted.

In another embodiment, a manner for transmitting the ODUflex data from the source node to the sink node is as follows: if switch cells in the Matrix segment of an intermediate node may be virtual container 4-16 concatenation (Virtual Container 4-16 concatenation, VC4-16c), the unidirectional adjustment signaling may be carried in a reserved overhead byte or a filling byte of VC4-16c during bandwidth adjustment and then transferred to the other side, or the unidirectional adjustment signaling is transferred to the other side in manners such as a special overhead bus. A format of the unidirectional adjustment signaling carried in the high order optical channel data tributary unit or the group of multi-channel parallel basic switch cells is not limited to the format of the above resizing control overhead.

Device Embodiment

Figure 9:
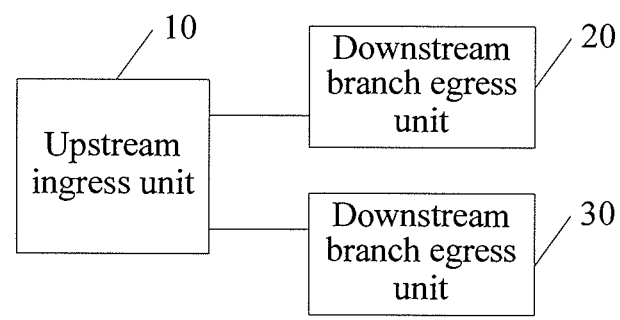
FIG. 9 is a schematic structural diagram of a communication node according to a device embodiment of the present invention.

A communication node, a schematic structural diagram of which is as shown in FIG. 9, includes: an upstream ingress unit 10 and at least two (two units are taken as an example in FIG. 9) downstream branch egress units 20 and 30.

The upstream ingress unit 10 is configured to send a group of multi-channel parallel basic switch cells to the at least two downstream branch egress units 20 and 30, where unidirectional adjustment signaling is carried in the group of multi-channel parallel basic switch cells and is used for indicating unidirectional addition or removal of the basic switch cell; perform polling detection on unidirectional adjustment response statuses returned by the at least two downstream branch egress units 20 and 30 according to a downstream branch egress unit list of a local node; and send normal signaling to the at least two downstream branch egress units 20 and 30 when determining the unidirectional adjustment response statuses returned by the at least two downstream branch egress units 20 and 30 is reception acknowledgement, for instructing the at least two downstream branch egress units 20 and 30 to adjust the corresponding basic switch cell at a next group of multi-channel parallel basic switch cells.

The upstream ingress unit 10 de-maps the ODUflex including service data from a high order optical channel data tributary unit, have the ODUflex borne in the group of multi-channel parallel basic switch cells, and then send the group of multi-channel parallel basic switch cells to all the downstream branch egress units.

The downstream branch egress units 20 and 30 are configured to return unidirectional adjustment response statuses carrying downstream branch egress unit identifiers after receiving the group of multi-channel parallel basic switch cells that carries the unidirectional adjustment signaling and is sent by the upstream ingress unit 10, to indicate acknowledgement of the reception of the unidirectional adjustment signaling; perform unidirectional adjustment of the corresponding basic switch cell in the next group of multi-channel parallel basic switch cells when receiving the normal signaling sent by the upstream ingress unit 10; and perform unidirectional bandwidth adjustment from the downstream branch egress units to the corresponding downstream nodes.

It can be understood that, if a basic switch cell is to be added, the downstream branch egress units 20 and 30 add the basic switch cell to be added into the group of multi-channel parallel basic switch cells, and the added basic switch cell carries services. If a basic switch cell is to be removed, the basic switch cell to be removed is removed from the next multi-channel parallel basic switch cells, and the removed basic switch cell does not carry any service, thereby ensuring that the services are not impaired during the bandwidth adjusting process.

The downstream branch egress units 20 and 30 perform the unidirectional bandwidth adjustment from the downstream branch egress units to the corresponding downstream nodes through the following steps.

A1: The service data of the ODUflex is first de-mapped from the received group of multi-channel parallel basic switch cells, and is mapped into the corresponding high order optical channel data tributary unit. Then, the high order optical channel data tributary unit is sent to the downstream node, and the high order optical channel data tributary unit carries the unidirectional adjustment signaling, for indicating unidirectional addition or removal of the time slot.

B1: After receiving the high order optical channel data tributary unit carrying the unidirectional adjustment signaling, the downstream node may return a unidirectional adjustment response status through a resizing control overhead corresponding to a time slot in the high order optical channel data tributary unit.

C1: When the unidirectional adjustment response status that is returned by the downstream node and received by the downstream branch egress units is reception acknowledgement, the downstream branch egress unit send normal signaling to the downstream node for instructing the downstream node to perform unidirectional adjustment of a corresponding time slot in the next multi-frame, for example, to re-allocate the time slot and carry a service or not to carry any service.

D1: When receiving the normal signaling, the downstream node performs unidirectional adjustment of the corresponding time slot at the next multi-frame.

It can be seen that, in the communication node according to the embodiment of the present invention, the upstream ingress unit 10 sends the group of multi-channel parallel basic switch cells to all the downstream branch egress units 20 and 30 of the local node, where the group of multi-channel parallel basic switch cells carry the unidirectional adjustment signaling for indicating unidirectional addition or removal of the basic switch cell; and when determining through polling detection that the received unidirectional adjustment response statuses returned by all the downstream branch egress units 20 and 30 is reception acknowledgement, sends the normal signaling to the downstream branch egress units 20 and 30. The downstream branch egress units 20 and 30 perform unidirectional adjustment of corresponding basic switch cell when receiving the next group of multi-channel parallel basic switch cells, and perform the unidirectional bandwidth adjustment from the downstream branch egress units to the corresponding downstream nodes. The communication node in the embodiment of the present invention implements lossless bandwidth adjustment in a point-to-multipoint OTN asymmetric bandwidth carrier system, and meets a change demand of an asymmetric bandwidth service traffic flow.

Figure 10:
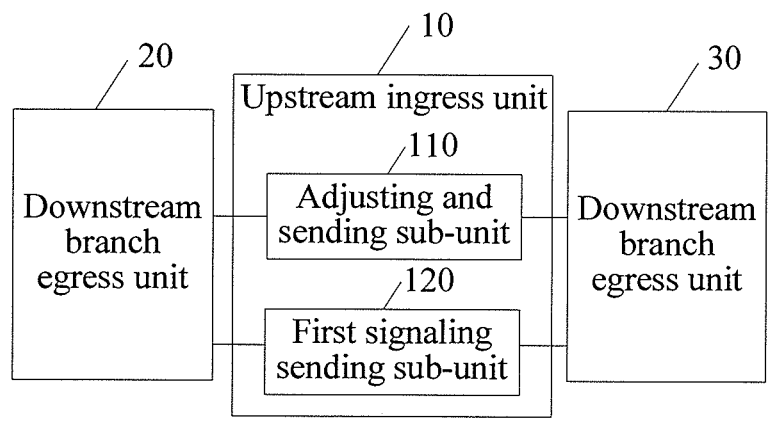
FIG. 10 is a schematic structural diagram of another communication node according to a device embodiment of the present invention.

In a specific embodiment, as shown in FIG. 10, the upstream ingress unit 10 in the communication node specifically includes: an adjusting and sending sub-unit 110 and a first signaling sending sub-unit 120.

An adjusting and sending sub-unit 110 is configured to, through transfer control signaling and a tributary port ID field in a resizing control overhead corresponding to a basic switch cell to be adjusted, indicate unidirectional addition or removal of the corresponding basic switch cell, and send the group of multi-channel parallel basic switch cells carrying unidirectional adjustment signaling to the at least two downstream branch egress units 20 and 30.

It can be understood that, a schematic structural diagram of the resizing control overhead sent by the adjusting and sending sub-unit 110 is as shown in FIG. 4.

A first signaling sending sub-unit 120 is configured to perform polling detection on the unidirectional adjustment response status returned by the at least two downstream branch egress units 20 and 30 according to the downstream branch egress unit list of the local node; and when determining that the received unidirectional adjustment response statuses returned by the at least two downstream branch egress units 20 and 30 is reception acknowledgement, send the normal signaling to the at least two downstream branch egress units 20 and 30, so as to instruct the at least two downstream branch egress units 20 and 30 to perform unidirectional adjustment of a corresponding basic switch cell in the next group of multi-channel parallel basic switch cells.

Figure 11:
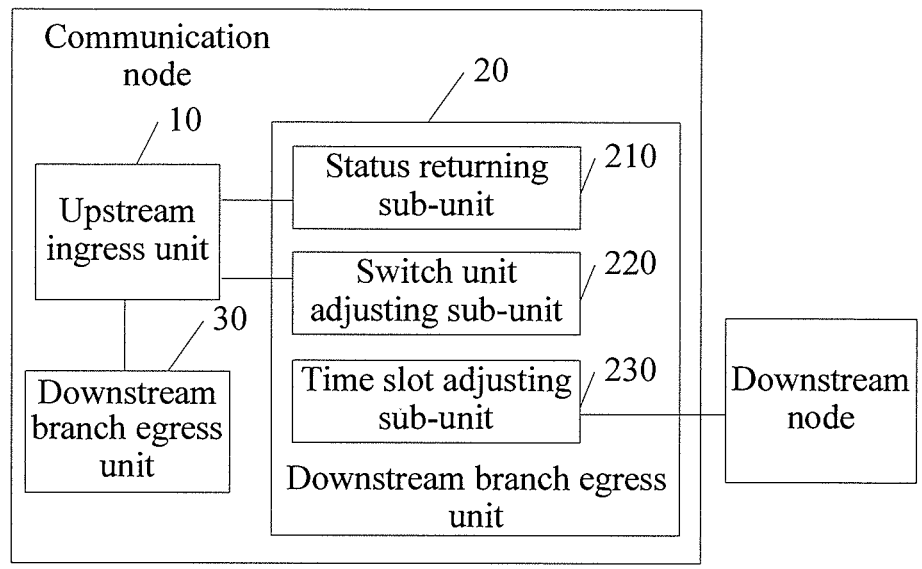
FIG. 11 is a schematic structural diagram of another communication node according to a device embodiment of the present invention.
Figure 12:
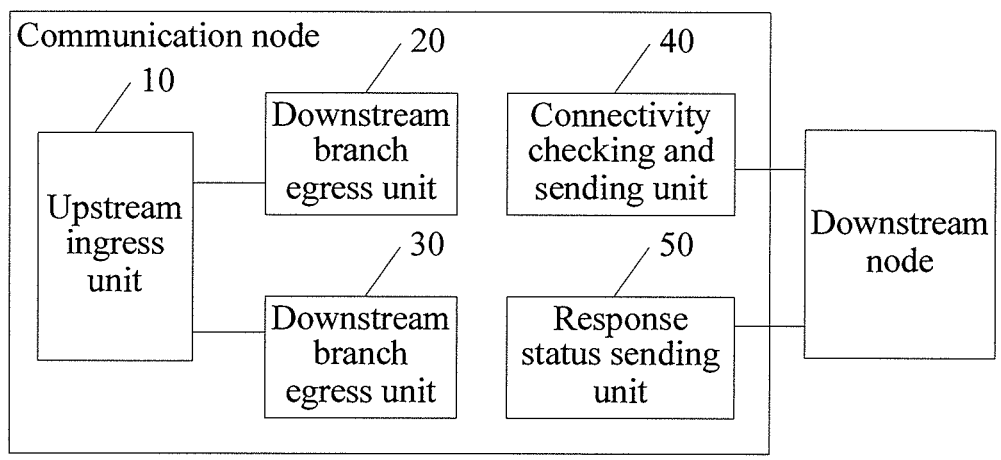
FIG. 12 is a schematic structural diagram of another communication node according to a device embodiment of the present invention.

In another specific embodiment, as shown in FIG. 11, the downstream branch egress unit 20 of the communication node specifically includes the following sub-units, and the downstream branch egress unit 30 may also include the following sub-units.

A status returning sub-unit 210 is configured to, after receiving the group of multi-channel parallel basic switch cells that carries the unidirectional adjustment signaling and sent by the upstream ingress unit 10, indicate acknowledgement of the reception of the unidirectional adjustment signaling through a tributary port ID and a tributary slot group status field in a resizing control overhead corresponding to the basic switch cell occupied by the unidirectional adjustment response status, and return the unidirectional adjustment response status to the upstream ingress unit 10.

A schematic structural diagram of the resizing control overhead returned by the status returning sub-unit 210 is as shown in FIG. 5. If it is required to adjust at least two basic switch cells, that is, carry the unidirectional adjustment signaling in the resizing control overhead corresponding to the at least two basic switch cells, when returning the unidirectional adjustment response status, the resizing control overhead corresponding to each basic switch cell is not required to carry the response status, while one resizing control overhead is allocated for one TPID, and the unidirectional adjustment response status corresponding to all the basic switch cells is bound in the allocated resizing control overhead. Here, one basic switch cell may be a first basic switch cell occupied by a channel in an opposite direction to the unidirectional channel, and corresponds to a tributary port ID of the downstream branch egress unit. In this way, resources occupied in the retransmission of the adjustment response status may be saved.

A switch cell adjusting sub-unit 220 is configured to, when receiving the normal signaling sent by the upstream ingress unit 10, perform unidirectional adjustment of the corresponding basic switch cell in the next group of multi-channel parallel basic switch cells.

A time slot adjusting sub-unit 230 is configured to perform unidirectional bandwidth adjustment from the downstream branch egress unit to the corresponding downstream node.

The time slot adjusting sub-unit 230 here may include:

a time slot adjusting and sending unit, configured to send the high order optical channel data tributary unit to the downstream node, and indicate unidirectional addition or removal of the time slot through transfer control signaling and a tributary port ID field in the resizing control overhead corresponding to the time slot to be adjusted in the high order optical channel data tributary unit; and a second signaling sending unit, configured to send normal signaling when the received unidirectional adjustment response status returned by the downstream node is reception acknowledgement, for instructing the downstream node to perform unidirectional adjustment of a corresponding time slot at the next multi-frame.

Here, the time slot adjusting sub-unit 230 can reduce signaling transmission during the bandwidth adjusting process, through the time slot adjusting and sending unit including some necessary fields in the resizing control overhead and sending the fields to the downstream node.

In another specific embodiment, the communication node further includes: a connectivity checking and sending unit 40 and a response status sending unit 50.

A connectivity checking and sending unit 40 is configured to determine whether unidirectional bandwidth adjustment is completed in the Matrix segments crossed to all the branches of the local node and the Link segments adjacent to all the branches of the local node, and send a unidirectional tributary slot connectivity check indication to all the downstream nodes.

The upstream ingress unit sends the normal signaling to all the downstream branch egress units, and all the downstream branch egress units perform unidirectional adjustment of the basic switch cell in the next group of multi-channel parallel basic switch cells. After the downstream nodes corresponding to all the downstream branch egress units perform the unidirectional adjustment of a time slot in the next multi-frame, the connectivity checking and sending unit 40 determines that the unidirectional bandwidth adjustment is completed in the Matrix segments crossed to all the branches of the local node and the Link segments adjacent to all the branches of the local node.

A response status sending unit 50 is configured to perform polling detection on unidirectional network connection response statuses returned by all the downstream nodes according to the branch egress unit list of the local node, and send the unidirectional network connection response status to the upstream node when determining that the received unidirectional network connection response statuses returned by all the downstream nodes is reception acknowledgement.

It can be understood that, the unidirectional tributary slot connectivity check indication may be indicated through a specific value {1} of {TSCC} in the resizing control overhead corresponding to the time slot to be adjusted in the high order optical channel data tributary unit, and a structure of the resizing control overhead is shown in FIG. 4. The unidirectional network connection response status received by the response status sending unit 50 maybe indicated through a specific value {TPID, ACK\NACK} of {TPID, NCS} in the resizing control overhead corresponding to the time slot to be adjusted in the high order optical channel data tributary unit. If the value is ACK, it indicates a status of reception acknowledgement; and if the value is MACK, it indicates a status of reception negative acknowledgement. A structure of the resizing control overhead is shown in FIG. 5.

It can be seen that, the bandwidth adjusting method in the embodiment of the present invention includes: the upstream ingress unit of the local node sends the group of multi-channel parallel basic switch cells to all the downstream branch egress units of the local node, where the unidirectional adjustment signaling is carried in the group of multi-channel parallel basic switch cells for indicating unidirectional addition or removal of the basic switch cell; the upstream ingress unit performs, according to a downstream branch egress unit list of the local node, polling detection on the unidirectional adjustment response statuses returned by the downstream branch egress units, and sends normal signaling when determining that the unidirectional adjustment response statuses returned by all the downstream branch egress units are reception acknowledgement; and all the downstream branch egress units receive the normal signaling, perform unidirectional adjustment of the corresponding basic switch cell in the next group of multi-channel parallel basic switch cells, and perform unidirectional bandwidth adjustment from the downstream branch egress units to the corresponding downstream nodes. The method in the embodiment of the present invention implements lossless bandwidth adjustment in a point-to-multipoint OTN asymmetric bandwidth carrier system, and meets the change demand of an asymmetric bandwidth service traffic flow.

Persons of ordinary skill in the art should understand that all or apart of the steps of the method according to the embodiments of the present invention may be implemented by a program instructing relevant hardware. The program may be stored in a computer readable storage medium, such as a read-only memory (ROM), a random access memory (RAM), a magnetic disk or an optical disk.

The bandwidth adjusting method and the communication node of the present invention are introduced in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A bandwidth adjusting method, comprising:
sending, by an upstream ingress unit of a local node, a group of multi-channel parallel basic switch cells to all downstream branch egress units of the local node, wherein a first adjustment signaling is carried in the group of multi-channel parallel basic switch cells and is used for indicating unidirectional addition or removal of a basic switch cell;
returning, by the downstream branch egress units that receive the group of multi-channel parallel basic switch cells carrying the first adjustment signaling, unidirectional adjustment response statuses that carry respective downstream branch egress unit identifiers and are used for indicating the reception of the first adjustment signaling;
sending, by the upstream ingress unit, a first normal signaling to all the downstream branch egress units when determining that the first adjustment response statuses returned by all the downstream branch egress units are reception acknowledgement by performing a polling detection on the unidirectional adjustment response statuses returned by the downstream branch egress units according to a downstream branch egress unit list of the local node, wherein the downstream branch egress unit list stores a corresponding relation between an upstream ingress unit identifier and all downstream branch egress unit identifiers; and after receiving the first normal signaling, adding or removing, by each downstream branch egress unit, the basic switch cell into or from a next group of multi-channel parallel basic switch cells according to the first adjustment signaling, adjusting a time slot of a high order optical channel data unit sent by the downstream branch egress unit to a downstream node, and instructing the downstream node to adjust the time slot of the high order optical channel data unit.

2. The method according to claim 1, wherein the first adjustment signaling is indicated through transfer control signaling and a tributary port ID field in a resizing control overhead of the basic switch cell to be added or removed; and the first adjustment response status is indicated through a tributary port ID and a tributary slot group status field in the resizing control overhead corresponding to the basic switch cell from the downstream branch egress unit to the upstream ingress unit.

3. The method according to claim 2, wherein the adjusting, by the downstream branch egress unit, the time slot of the high order optical channel data unit sent by the downstream branch egress unit to the downstream node, and instructing the downstream node to adjust the time slot of the received high order optical channel data unit, comprises:

carrying second adjustment signaling in the transfer control signaling and the tributary port ID field in a resizing control overhead of the high order optical channel data unit sent to the downstream node, to instruct the downstream node to unidirectionally add or remove the time slot; and when a second adjustment response status that is returned by the downstream node and received by the downstream branch egress units is reception acknowledgement, sending second normal signaling to the downstream node, for instructing the downstream node to adjust the time slot of the received high order optical channel data unit.

4. The method according to claim 1, further comprising:

when determining that the basic switch cell is added into or removed from Matrix segments crossed to all branches of the local node and the time slot is adjusted in Link segments adjacent to all branches of the local node, sending a unidirectional tributary slot connectivity check indication to all the downstream nodes; and when determining that received unidirectional network connection response statuses returned by all the downstream nodes are reception acknowledgement, sending the received unidirectional network connection response statuses to an upstream node.

5. The method according to claim 4, wherein the unidirectional tributary slot connectivity check indication is indicated through a tributary slot connectivity check TSCC field in a resizing control overhead in the high order optical channel data unit; and the unidirectional network connection response status is indicated through a tributary port ID and a network connection status field in the resizing control overhead in the high order optical channel data unit returned by the downstream node.

6. A communication node, comprising: an upstream ingress unit and at least two downstream branch egress units, wherein the upstream ingress unit is configured to send a group of multi-channel parallel basic switch cells to the at least two downstream branch egress units, wherein first adjustment signaling is carried in the group of multi-channel parallel basic switch cells and is used for indicating unidirectional addition or removal of a respective basic switch cell; perform polling detection on unidirectional adjustment response statuses returned by the at least two downstream branch egress units according to a downstream branch egress unit list of the communication node; and send first normal signaling to the at least two downstream branch egress units when determining the unidirectional adjustment response statuses returned by the at least two downstream branch egress units are reception acknowledgement; wherein the unidirectional adjustment response statuses carry respective downstream branch egress unit identifiers and are used for indicating the reception of the first adjustment signaling, and wherein the downstream branch egress unit list stores a corresponding relation between an upstream ingress unit identifier and downstream branch egress unit identifiers; and each downstream branch egress unit is configured to return an unidirectional adjustment response status after receiving the group of multi-channel parallel basic switch cells carrying the first adjustment signaling; after receiving the first normal signaling, add or remove a respective basic switch cell into or from a next group of multi-channel parallel basic switch cells according to the first adjustment signaling; and adjust a time slot of a high order optical channel data unit sent to a downstream node, and instruct the downstream node to adjust the time slot of the high order optical channel data unit.

* * * * *